(12) United States Patent
Matsui

(10) Patent No.: US 9,628,669 B2
(45) Date of Patent: Apr. 18, 2017

(54) IMAGE PROCESSING APPARATUS FOR DETECTING CONFIDENTIAL DRAWING COMMANDS WITHIN PRINT DATA

(71) Applicant: FUJI XEROX CO., LTD., Tokyo (JP)

(72) Inventor: Kenki Matsui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/847,631

(22) Filed: Sep. 8, 2015

(65) Prior Publication Data
US 2016/0277637 A1    Sep. 22, 2016

(30) Foreign Application Priority Data
Mar. 19, 2015    (JP) ................ 2015-055945

(51) Int. Cl.
| G06K 15/00 | (2006.01) |
| H04N 1/44 | (2006.01) |
| H04N 1/00 | (2006.01) |
| G06K 9/00 | (2006.01) |

(52) U.S. Cl.
CPC ......... *H04N 1/444* (2013.01); *G06K 9/00456* (2013.01); *H04N 1/00411* (2013.01); *H04N 2201/0094* (2013.01)

(58) Field of Classification Search
CPC . H04N 1/444; G06K 9/00456; G06K 9/00483
See application file for complete search history.

(56) References Cited

U.S. PATENT DOCUMENTS

| 2005/0008225 | A1* | 1/2005 | Yanagisawa | ...... G06F 17/30256 |
| | | | | 382/190 |
| 2005/0144469 | A1* | 6/2005 | Saitoh | ...... G06F 21/608 |
| | | | | 713/189 |
| 2007/0229898 | A1* | 10/2007 | Tomaru | ...... G03G 15/5008 |
| | | | | 358/1.16 |
| 2009/0064312 | A1* | 3/2009 | Furuichi | ...... G06F 21/84 |
| | | | | 726/16 |
| 2010/0231953 | A1* | 9/2010 | Miyazaki | ...... G03G 15/5062 |
| | | | | 358/1.15 |
| 2014/0300912 | A1* | 10/2014 | Hohensee | ...... G06K 15/4095 |
| | | | | 358/1.13 |

FOREIGN PATENT DOCUMENTS

| JP | 2008-49585 A | 3/2008 |
| JP | 2010-49520 A | 3/2010 |
| JP | 2010-208075 A | 9/2010 |

* cited by examiner

*Primary Examiner* — Benjamin O Dulaney
(74) *Attorney, Agent, or Firm* — Sughrue Mion, PLLC

(57) ABSTRACT

An image processing apparatus includes a memory, a generation unit, and a warning unit. The memory stores drawing commands used to determine print data for which security control is necessary. The generation unit generates raster image data in accordance with input print data. The warning unit issues a warning that security control is necessary for print data in a case where raster image data has not been successfully generated from the print data in the generation unit and drawing commands of the print data include a drawing command stored in the memory.

15 Claims, 12 Drawing Sheets

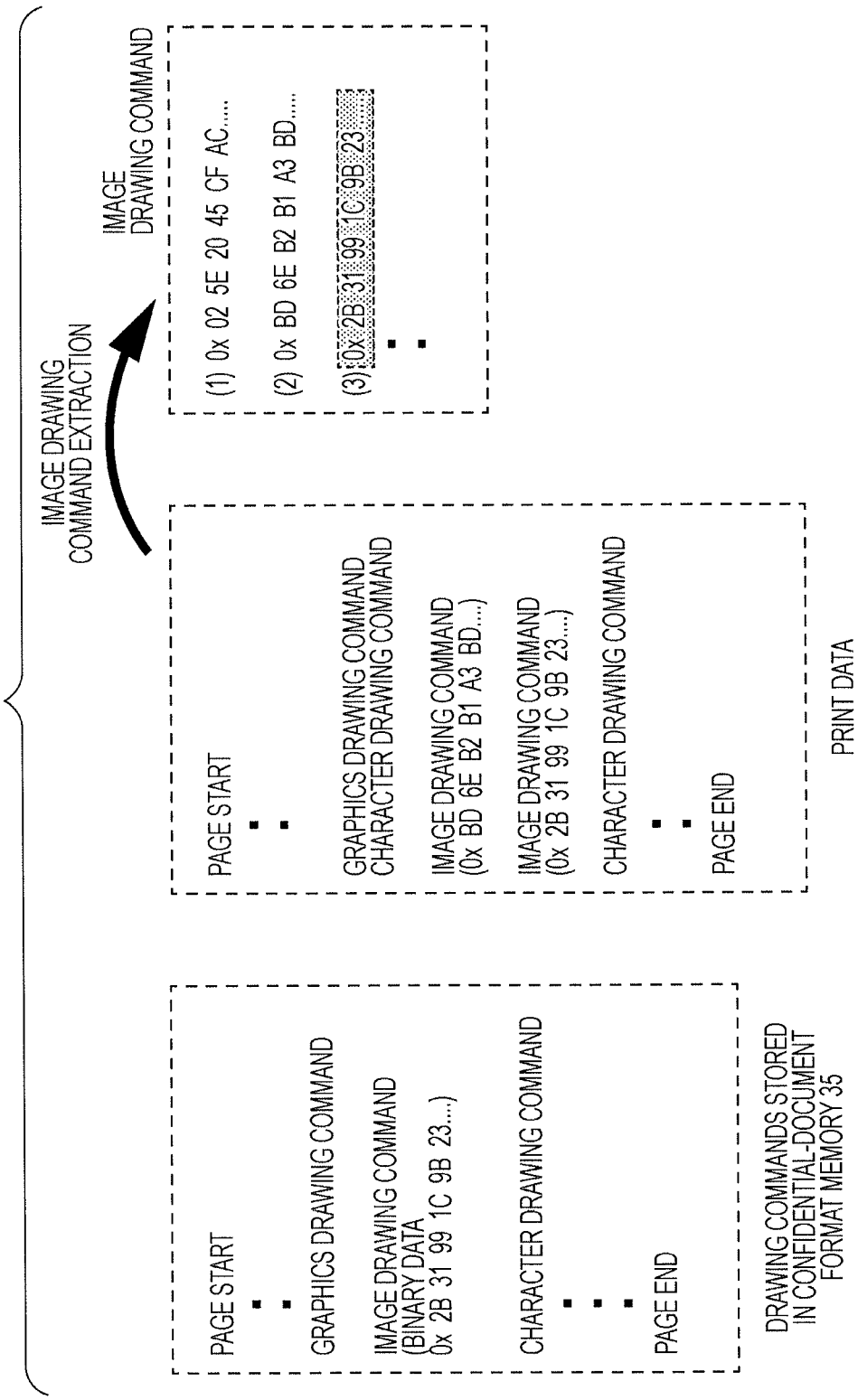

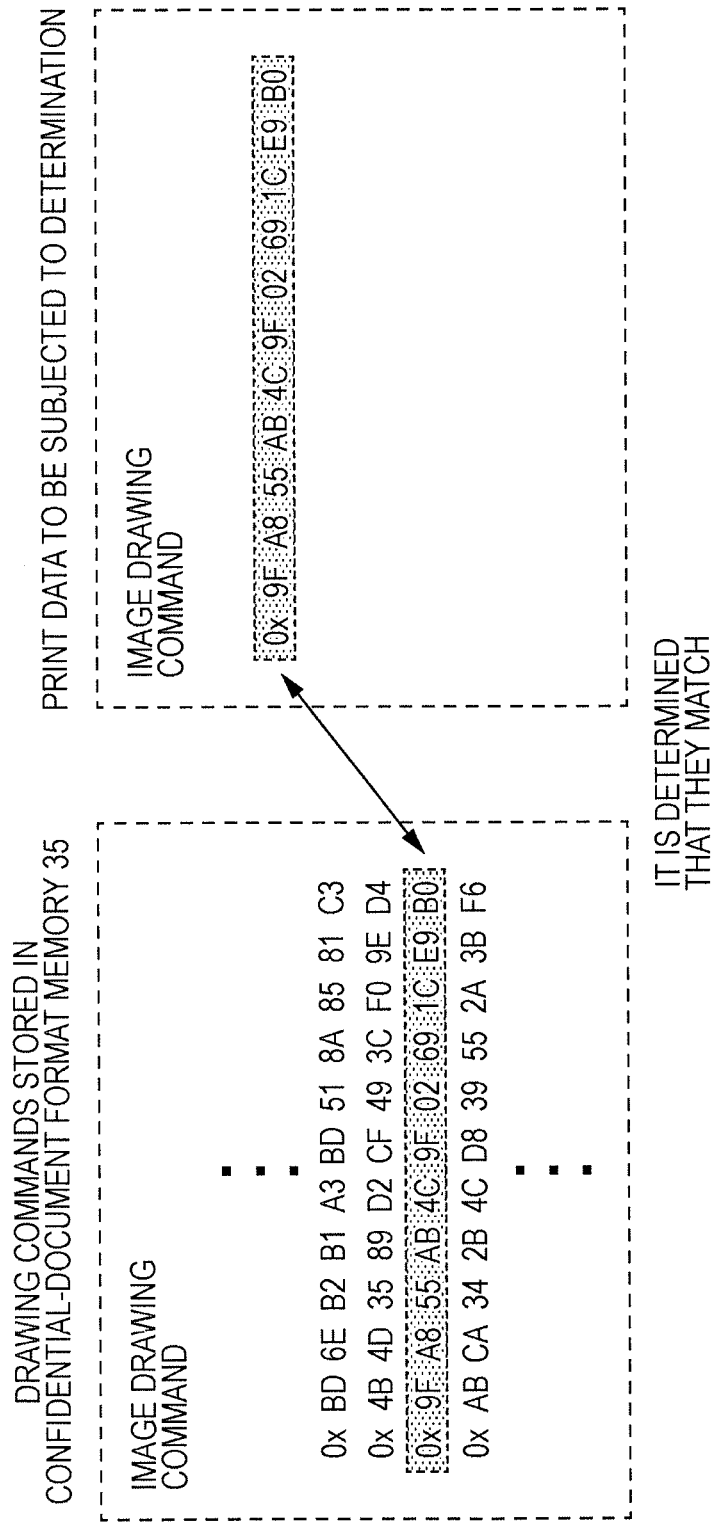

IMAGE PROCESSING APPARATUS FOR DETECTING CONFIDENTIAL DRAWING COMMANDS WITHIN PRINT DATA

CROSS-REFERENCE TO RELATED APPLICATIONS

This application is based on and claims priority under 35 USC 119 from Japanese Patent Application No. 2015-055945 filed Mar. 19, 2015.

BACKGROUND

Technical Field

The present invention relates to an image processing apparatus, an image forming apparatus, and a non-transitory computer readable medium.

SUMMARY

According to an aspect of the invention, there is provided an image processing apparatus including a memory, a generation unit, and a warning unit. The memory stores drawing commands used to determine print data for which security control is necessary. The generation unit generates raster image data in accordance with input print data. The warning unit issues a warning that security control is necessary for print data in a case where raster image data has not been successfully generated from the print data in the generation unit and drawing commands of the print data include a drawing command stored in the memory.

BRIEF DESCRIPTION OF THE DRAWINGS

An exemplary embodiment of the present invention will be described in detail based on the following figures, wherein:

FIG. 9 is a diagram for describing, using a specific example of an image drawing command, the way in which a confidentiality determination process for image drawing commands is performed;

FIG. 12 is a diagram for describing the case where an image drawing command whose binary data partially matches the binary data of an image drawing command included in the confidential-document format memory is included in print data to be subjected to a determination.

DETAILED DESCRIPTION

In the following, an exemplary embodiment of the present invention will be described in detail with reference to the drawings.

Figure 1:
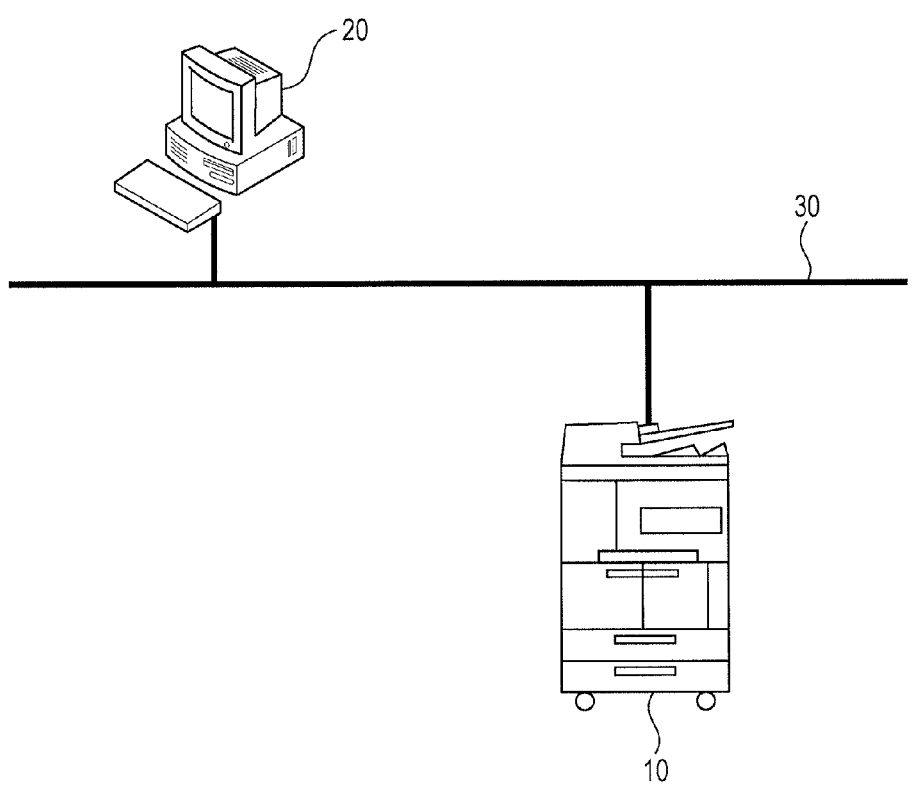
FIG. 1 is a diagram illustrating the configuration of an image forming system according to an exemplary embodiment of the present invention.

FIG. 1 is a block diagram illustrating the configuration of an image forming system according to an exemplary embodiment of the present invention.

An image forming system according to an exemplary embodiment of the present invention includes an image forming apparatus 10 and a terminal apparatus 20, which are connected to each other via a network 30 as illustrated in FIG. 1. The terminal apparatus 20 generates print data, and transmits the generated print data to the image forming apparatus 10 via the network 30. The image forming apparatus 10 receives the print data transmitted from the terminal apparatus 20, performs various image processes as an image processing apparatus, and outputs images corresponding to the print data on sheets. Note that the image forming apparatus 10 is a so-called multifunction machine having plural functions such as a print function, a scan function, a copy function, a facsimile function, and the like.

Figure 2:
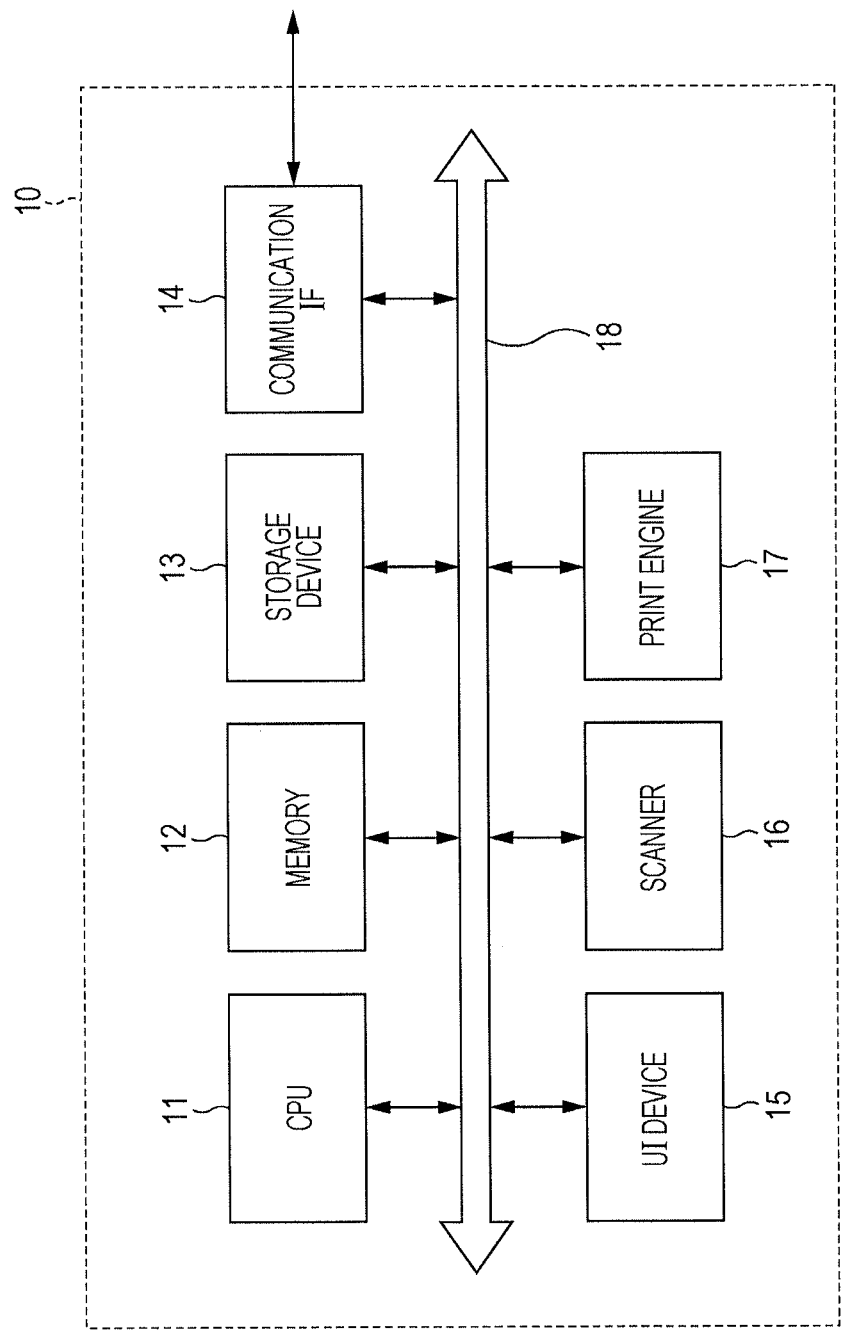
FIG. 2 is a block diagram illustrating a hardware configuration of an image forming apparatus according to an exemplary embodiment of the present invention.

Next, a hardware configuration of the image forming apparatus 10 in the image forming system according to the present exemplary embodiment is illustrated in FIG. 2.

As illustrated in FIG. 2, the image forming apparatus 10 includes a central processing unit (CPU) 11, a memory 12, a storage device 13, a communication interface (IF) 14, a user interface (UI) device 15, a scanner 16, and a print engine 17. Examples of the storage device 13 include a hard disk drive (HDD). The communication IF 14 transmits and receives data to and from an external device and the like via the network 30. The UI device 15 includes a touch panel or a liquid crystal display and a keyboard. These structural elements are connected to each other via a control bus 18.

The CPU 11 performs a certain process in accordance with a control program stored in the memory 12 or the storage device 13, and controls an operation of the image forming apparatus 10.

Note that it has been described in the present exemplary embodiment that the CPU 11 reads and executes the control program stored in the memory 12 or the storage device 13; however, the program may also be stored in a storage medium such as a CD-ROM and supplied to the CPU 11.

Figure 3:
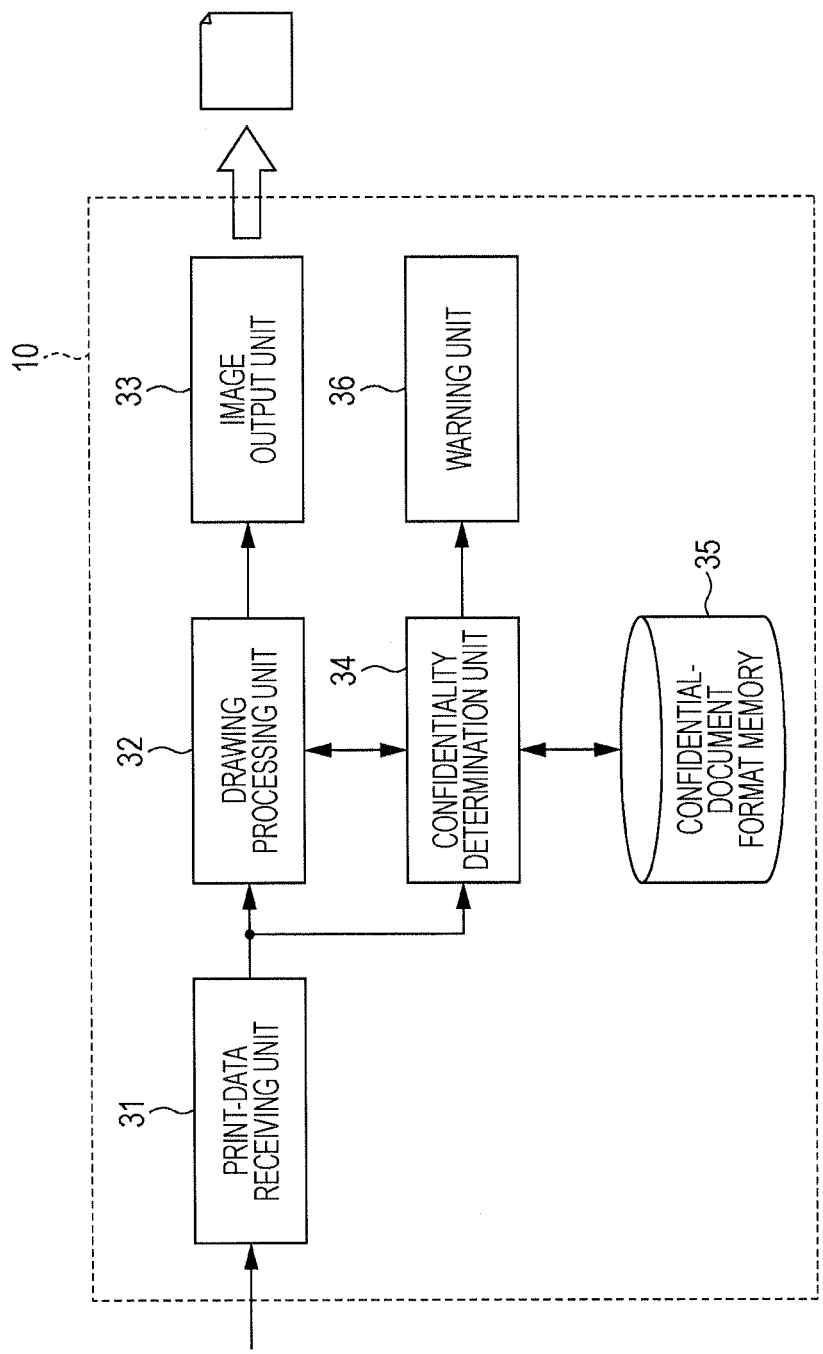
FIG. 3 is a block diagram illustrating a functional configuration of the image forming apparatus according to the exemplary embodiment of the present invention.

FIG. 3 is a block diagram illustrating a functional configuration of the image forming apparatus 10 realized by execution of the above-described control program.

As illustrated in FIG. 3, the image forming apparatus 10 according to the present exemplary embodiment includes a print-data receiving unit 31, a drawing processing unit 32, an image output unit 33, a confidentiality determination unit 34, a confidential-document format memory 35, and a warning unit 36.

The print-data receiving unit 31 receives print data transmitted from the terminal apparatus 20, the print data being data in, for example, a page description language (PDL) format.

The print data received by the print-data receiving unit 31 is input to the drawing processing unit 32, and the drawing processing unit 32 serves as a generation unit that generates raster image data (image data in a raster format) in accordance with the input print data.

The image output unit 33 outputs images on recording mediums such as sheets for printing in accordance with the raster image data generated by the drawing processing unit 32.

The confidential-document format memory 35 is a memory for storing, in advance, drawing commands used to determine print data for which security control is necessary, and stores format images (form images) used to generate confidential documents, the format images being stored in a PDL format.

Specifically, the confidential-document format memory 35 stores drawing commands used to draw a format image used to generate a confidential document, as drawing commands used to determine print data for which security control is necessary.

Drawing commands for kinds, which are character drawing, graphics drawing, and image drawing, are stored in the confidential-document format memory 35.

In the case where a document format of a confidential document is actually registered in the image forming apparatus 10, print data in a document format for generating a confidential document is transmitted to the image forming apparatus 10 in advance. Then, the image forming apparatus 10 analyzes drawing commands of the print data in this document format, extracts a drawing command for character drawing, a drawing command for graphics drawing, and a drawing command for image drawing, and registers the drawing commands in the confidential-document format memory 35.

In the case where raster image data has not been successfully generated from print data in the drawing processing unit 32, the confidentiality determination unit 34 determines whether or not the drawing commands of this print data include a drawing command stored in the confidential-document format memory 35.

Specifically, the confidentiality determination unit 34 determines whether or not the drawing commands of the print data include a drawing command stored in the confidential-document format memory 35 on a per-type-of-drawing-command basis in accordance with the types of the drawing commands included in the print data, the types being character drawing, graphics drawing, and image drawing.

Note that in the case where the confidentiality determination unit 34 compares a certain drawing command among the drawing commands included in the print data with a certain drawing command among the drawing commands stored in the confidential-document format memory 35, the confidentiality determination unit 34 determines that two drawing commands are the same not only when the two drawing commands match perfectly. The confidentiality determination unit 34 calculates a matching rate (the degree of matching) between a certain drawing command among the drawing commands of the print data and a certain drawing command among the drawing commands stored in the confidential-document format memory 35. In the case where the calculated matching rate is greater than or equal to a preset value, the confidentiality determination unit 34 determines that the certain drawing command of this print data is the same as the certain drawing command stored in the confidential-document format memory 35.

That is, the confidentiality determination unit 34 determines that even the print data for drawing an image generated using confidential-document format PDL data (print data) stored in the confidential-document format memory 35 is print data for drawing a confidential document.

In addition, in the case where a certain drawing command among the drawing commands of the print data matches a portion of a certain drawing command among the drawing commands stored in the confidential-document format memory 35, the confidentiality determination unit 34 determines that the certain drawing command of this print data is the same as the certain drawing command stored in the confidential-document format memory 35.

In the case where the confidentiality determination unit 34 has determined that the drawing commands of print data from which raster image data has not been successfully generated include a drawing command stored in the confidential-document format memory 35, the warning unit 36 warns the user via a display panel or the like that security control is necessary for this print data.

That is, in the case where the raster image data has not been successfully generated from the print data in the drawing processing unit 32 and where the drawing commands of this print data include a drawing command stored in the confidential-document format memory 35, the warning unit 36 issues a warning that security control is necessary for this print data.

Note that, in the present exemplary embodiment, the confidentiality determination unit 34 determines whether or not drawing commands of input print data match drawing commands stored in the confidential-document format memory 35 for a confidential document format image, and the warning unit 36 issues a warning in accordance with a determination result of the confidentiality determination unit 34. The confidentiality determination unit 34 and the warning unit 36 may be realized by one functional configuration and configured to serve as a warning unit.

Figure 4:
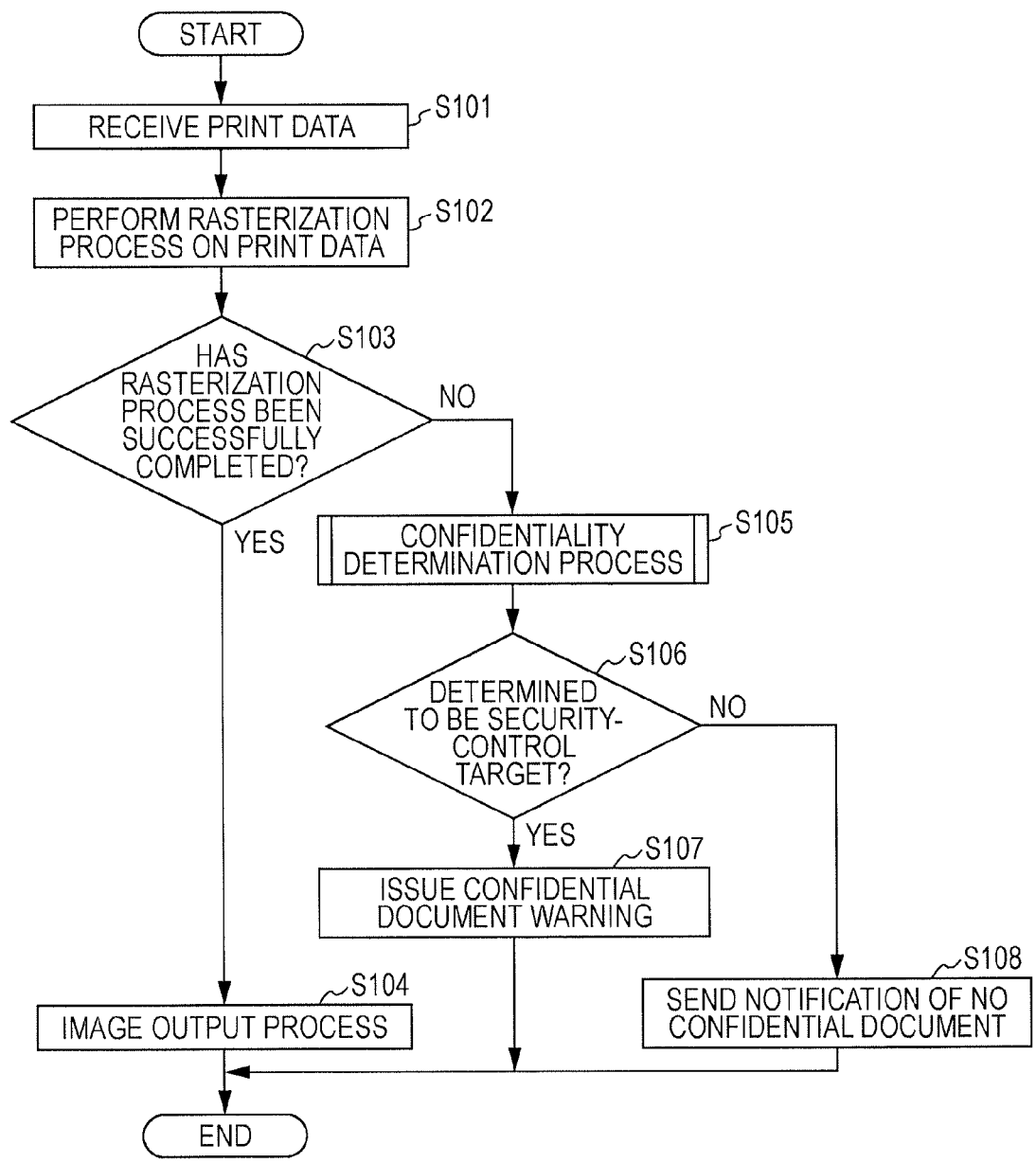
FIG. 4 is a flowchart illustrating an operation of the image forming apparatus according to the exemplary embodiment of the present invention.

Next, an operation of the image forming apparatus 10 according to the present exemplary embodiment will be described in detail with reference to the flowchart of FIG. 4.

First, as a precondition, for example, the format of a confidential document transfer of which to the outside, for example, the outside the company needs to be prevented is preregistered as print data in, for example, a PDL format in the confidential-document format memory 35 of the image forming apparatus 10.

In the image forming apparatus 10, when the print-data receiving unit 31 receives print data from the outside such as the terminal apparatus 20 or the like (step S101), the drawing processing unit 32 converts the received print data into raster image data by performing a rasterization process (a drawing process) on the received print data (step S102).

In the case where the rasterization process has been successfully completed (Yes in step S103), the image output unit 33 outputs images based on the successfully generated raster image data on sheets (step S104).

In the case where the rasterization process has not been successfully completed for the print data in the drawing processing unit 32 (No in step S103), the confidentiality determination unit 34 determines whether or not the drawing commands of this print data include a drawing command stored in the confidential-document format memory 35 (step S105). Note that the details of a confidentiality determination process in the confidentiality determination unit 34 will be described later.

Figure 5:
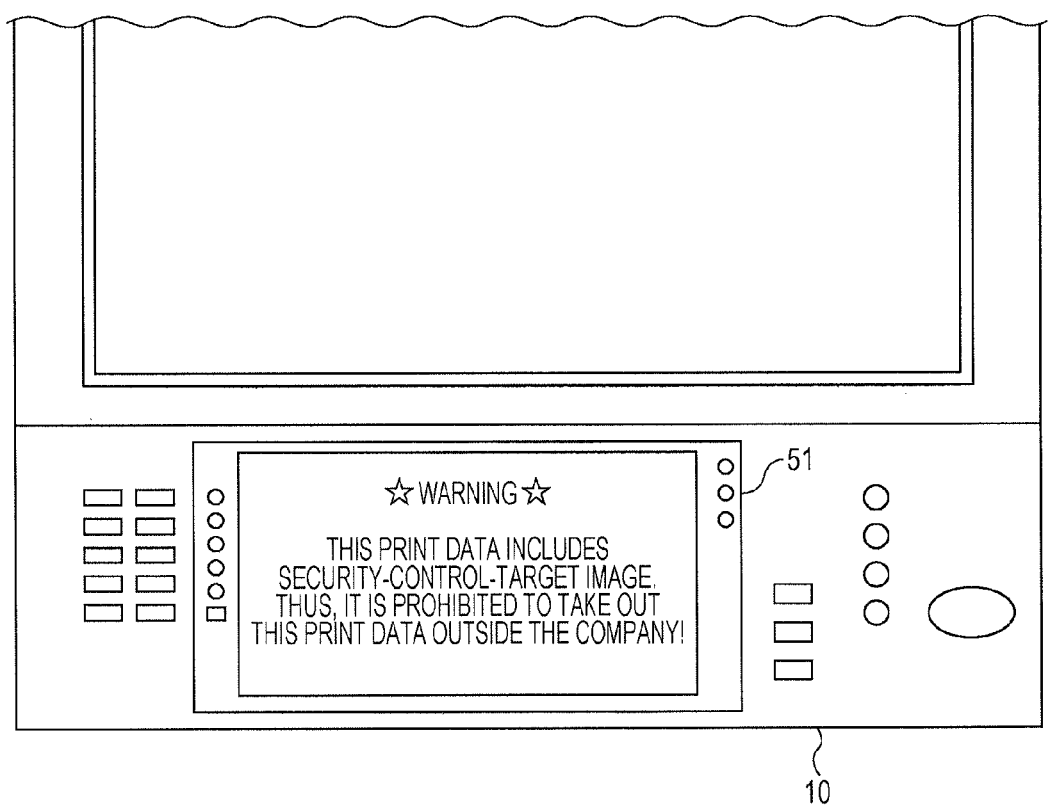
FIG. 5 is a diagram illustrating an example of a warning, which is displayed on an operation panel of the image forming apparatus.

Then, in the case where it is determined in the confidentiality determination process of step S105 that the print data for which the rasterization process has not been successfully completed is confidential information and is a security-control target (Yes in step S106), the warning unit 36 displays a warning that the print data includes security-control-target information and it is prohibited to take out the print data to the outside the company, for example, on an operation panel 51 of the image forming apparatus 10 as illustrated in FIG. 5 (step S107).

Thus, even a user who tries to transfer this print data to the outside to track down the cause of errors recognizes that this print data is confidential information, and stops transferring this print data to the outside.

In addition, in the case where it is determined in the confidentiality determination process of step S105 that the print data for which the rasterization process has not been successfully completed is not confidential information and is not a security-control target (No in step S106), the user is notified as such (step S108).

In the image forming system according to the present exemplary embodiment, even in the case where print data is transmitted from the terminal apparatus 20 to the image forming apparatus 10 and execution of a print process is ordered, but some kind of error has occurred in the middle of the drawing process in which the print data is converted into raster image data in the image forming apparatus 10, the warning unit 36 issues a warning that the print data is a security-control target.

Figure 6:
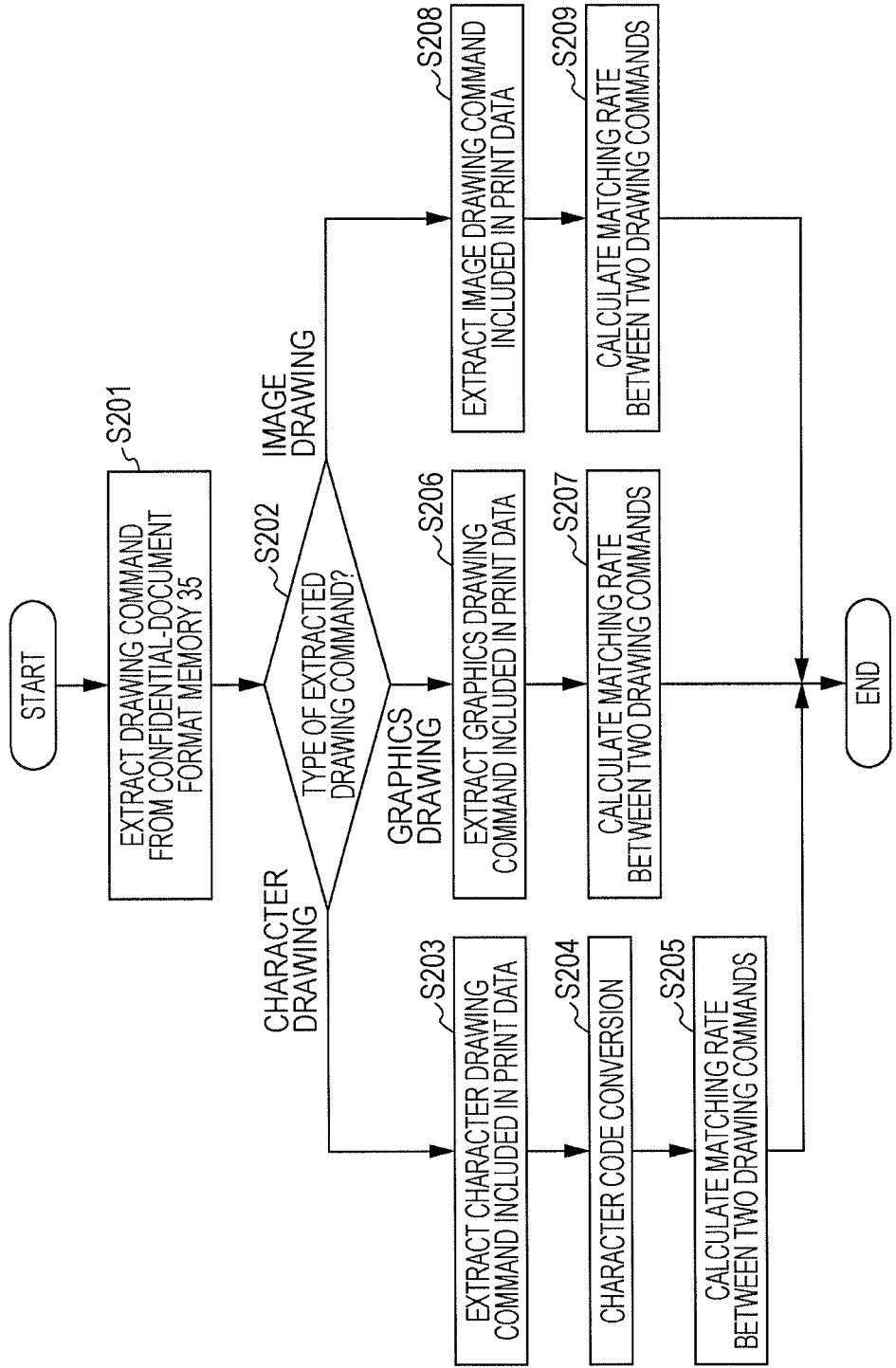
FIG. 6 is a flowchart for describing the details of a confidentiality determination process described in the flowchart of FIG. 4.

Next, the details of the confidentiality determination process (step S105) described in the flowchart of FIG. 4 will be described with reference to the flowchart of FIG. 6.

The confidentiality determination unit 34 extracts a drawing command from the confidential-document format memory 35 (step S201), and determines the type of the extracted drawing command, which is either character drawing, graphics drawing, or image drawing (step S202).

Then, in the case where the extracted drawing command is a drawing command for character drawing, the confidentiality determination unit 34 extracts only a character drawing command from among the drawing commands included in the print data (step S203).

Then, the confidentiality determination unit 34 converts the character code of the extracted character drawing command into a preset-format character code (step S204). For example, the confidentiality determination unit 34 converts the character code of the extracted character drawing command into an SJIS-format character code.

Then, the confidentiality determination unit 34 calculates a matching rate between the character drawing command extracted from the confidential-document format memory 35 and the character drawing command extracted from the print data (step S205).

In the case where the calculated matching rate is greater than or equal to a preset value, for example, the calculated matching rate is greater than or equal to 90%, the confidentiality determination unit 34 determines that the print data includes confidential information and is a security-control target.

In the case where it is determined in the determination process of step S202 that the extracted drawing command is a drawing command for graphics drawing, the confidentiality determination unit 34 extracts only a graphics drawing command from among the drawing commands included in the print data (step S206).

Then, the confidentiality determination unit 34 calculates a matching rate between the graphics drawing command extracted from the confidential-document format memory 35 and the graphics drawing command extracted from the print data (step S207).

In the case where the calculated matching rate is greater than or equal to a preset value, for example, the calculated matching rate is greater than or equal to 90%, the confidentiality determination unit 34 determines that the print data includes confidential information and is a security-control target.

In the case where it is determined in the determination process of step S202 that the extracted drawing command is a drawing command for image drawing, the confidentiality determination unit 34 extracts only an image drawing command from among the drawing commands included in the print data (step S208).

Then, the confidentiality determination unit 34 calculates a matching rate between the image drawing command extracted from the confidential-document format memory 35 and the image drawing command extracted from the print data (step S209).

In the case where the calculated matching rate is greater than or equal to a preset value, for example, the calculated matching rate is greater than or equal to 90%, the confidentiality determination unit 34 determines that the print data includes an image representing confidential information and is a security-control target.

Note that the above-described process is performed on all the drawing commands stored in the confidential-document format memory 35 successively.

Next, a specific determination method in the confidentiality determination process will be described on a per-type-of-drawing-command basis.

[Case of Character Drawing Command]

First, a specific method in the case where character drawing commands are compared with each other will be described.

The confidentiality determination unit 34 extracts drawing start coordinates of a character from a character drawing command stored in the confidential-document format memory 35, and confirms whether or not the print data includes a character drawing command indicating the same drawing start coordinates. In the case where the print data includes a character drawing command whose drawing start coordinates match the drawing start coordinates of a character extracted from a character drawing command stored in the confidential-document format memory 35, the character codes (byte strings) for which drawing has been instructed by using two character drawing commands that are comparison targets are compared with each other, and it is determined whether or not the character codes match.

Here, there may be the case where character code formats representing characters may differ from each other when the environment in which the drawing commands registered in the confidential-document format memory 35 are generated differs from the environment in which the print data is generated.

Thus, the confidentiality determination unit 34 converts the character code of a character for which drawing has been instructed by using the print data into the character code of a character of the drawing command registered in the confidential-document format memory 35, and thereafter determines the degree of matching.

Next, using a specific example of a character drawing command, the way in which a confidentiality determination process for character drawing commands is performed will be described with reference to FIG. 7.

Figure 7:
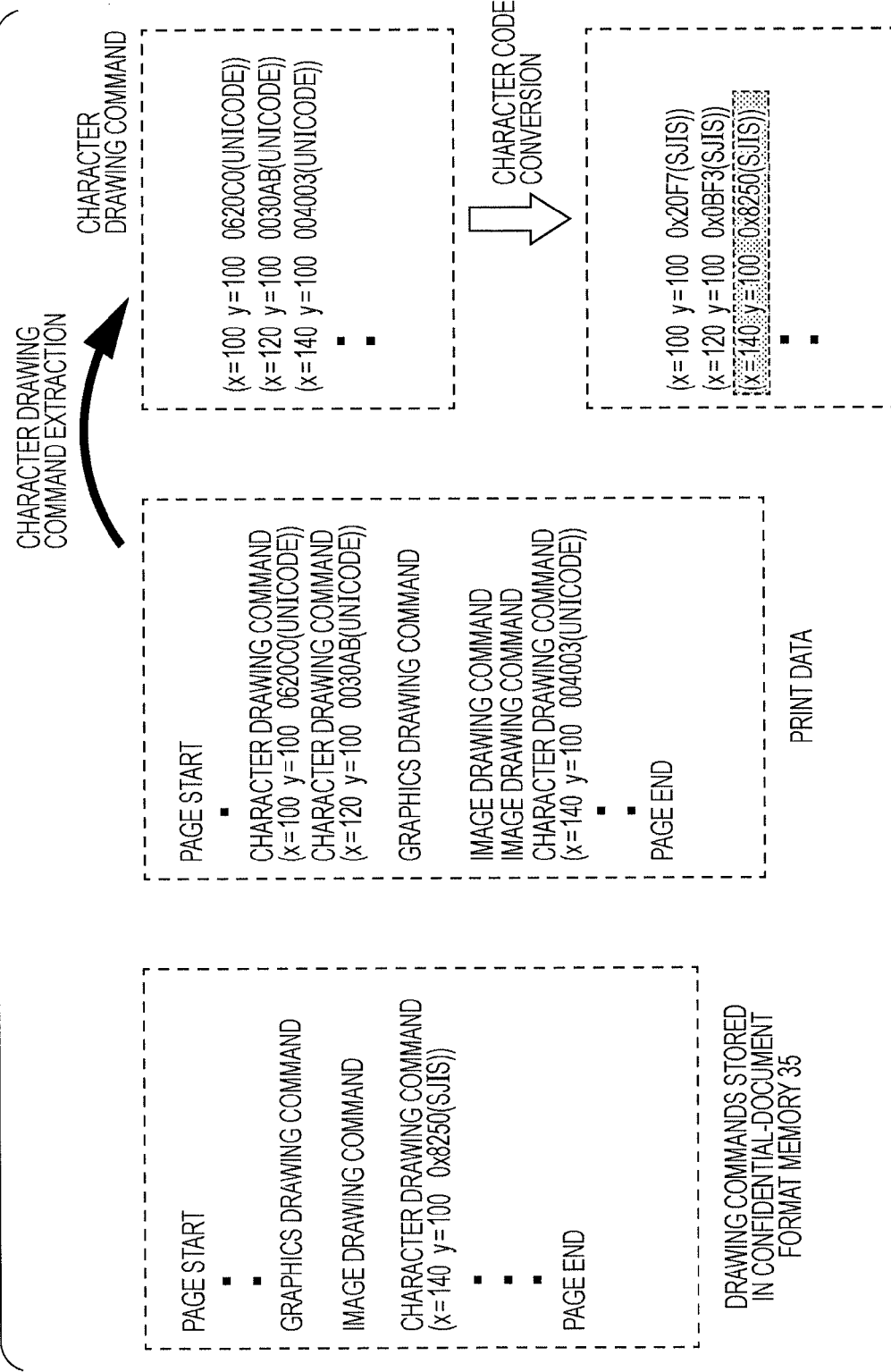
FIG. 7 is a diagram for describing, using a specific example of a character drawing command, the way in which a confidentiality determination process for character drawing commands is performed.

For example, a description will be made using the case where, as illustrated in FIG. 7, a character drawing command, which is a drawing command of "x=140 y=100 0x8250 (SJIS)", is stored in the confidential-document format memory 35.

This drawing command indicates that a character whose character code is 0x8250 (SJIS) is to be drawn at the position where the x coordinate is 140 and the y coordinate is 100.

The confidentiality determination unit 34 extracts character drawing commands from print data to be subjected to the confidentiality determination process, and converts the character codes of the extracted character drawing commands into, for example, SJIS-format character codes.

Then, the confidentiality determination unit 34 compares the character drawing commands obtained after the character code conversion with the character drawing command stored in the confidential-document format memory 35. As a result, in the case where the confidentiality determination unit 34 confirms that a character drawing command of "x=140 y=100 0x8250 (SJIS)" is included in the print data that is a comparison target, the confidentiality determination unit 34 determines that the two character drawing commands match.

[Case of Graphics Drawing Command]

Next, a specific method in the case where graphics drawing commands are compared with each other will be described.

In the case where graphics drawing commands are compared with each other, a determination is performed as in the following in accordance with attributes of graphics.

(1) Case of Straight Line

In the case where the confidentiality determination unit 34 compares drawing commands that specify drawing of a straight line with each other, the confidentiality determination unit 34 extracts drawing start coordinates of a drawing command stored in the confidential-document format memory 35, and confirms whether or not the print data includes a straight-line drawing command indicating the same drawing start coordinates.

In the case where the print data includes a straight-line drawing command whose drawing start coordinates match the drawing start coordinates of the drawing command stored in the confidential-document format memory 35, the confidentiality determination unit 34 calculates, for each of the two straight-line drawing commands, the direction and scale of the vector of a straight line and determines whether or not the two straight-line drawing commands match in terms of direction and scale. Here, the confidentiality determination unit 34 treats the two straight-line drawing commands as the same straight-line drawing commands when the matching rate is greater than or equal to a preset value.

Next, using a specific example of a straight-line drawing command, the way in which a confidentiality determination process for straight-line drawing commands is performed will be described with reference to FIG. 8.

Figure 8:
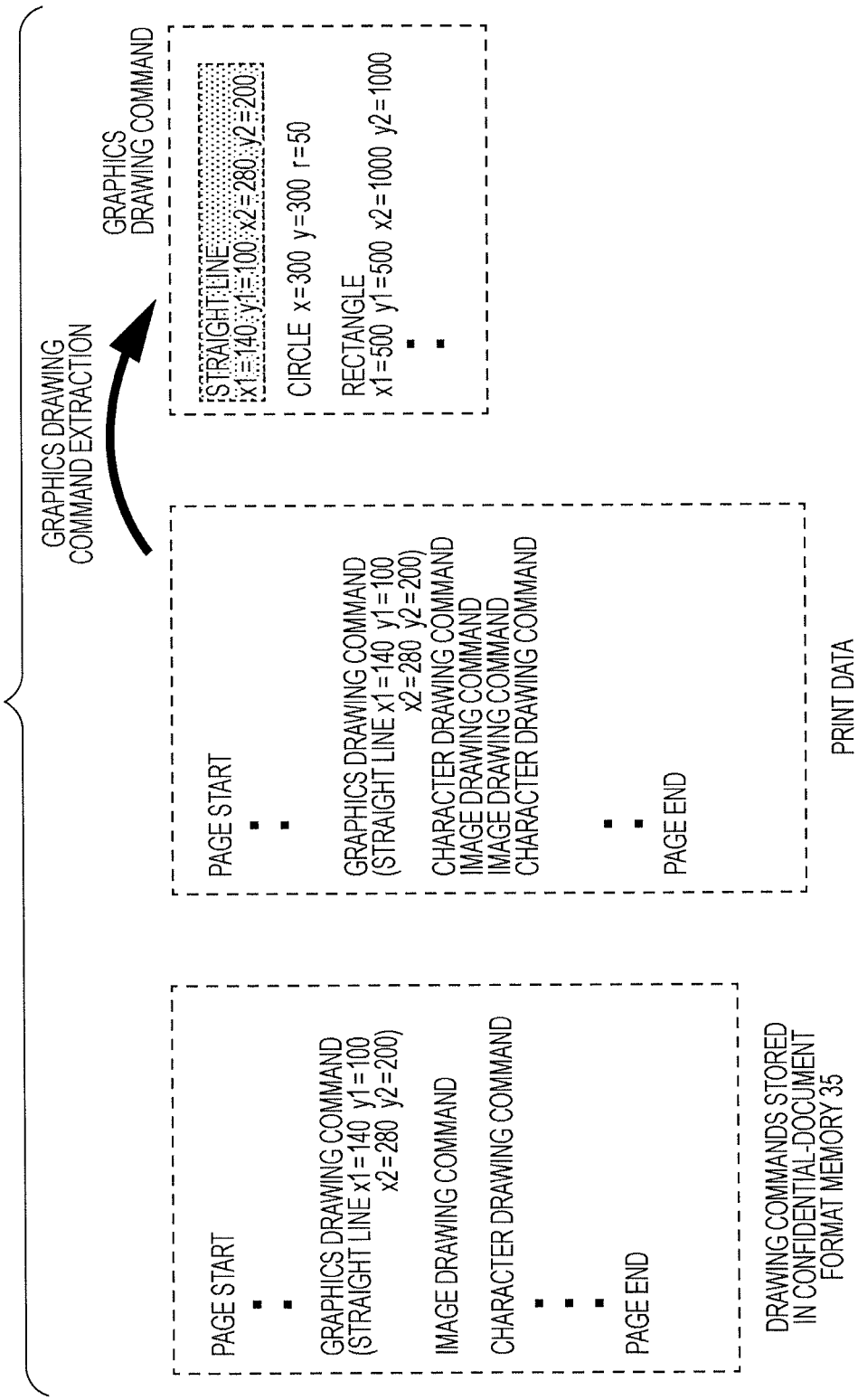
FIG. 8 is a diagram for describing, using a specific example of a straight-line drawing command, the way in which a confidentiality determination process for straight-line drawing commands is performed.

For example, a description will be made using the case where, as illustrated in FIG. 8, a graphics drawing command, which is a drawing command of "straight line x1=140 y1=100 x2=280 y2=200", is stored in the confidential-document format memory 35.

This drawing command indicates that a straight line is to be drawn from the position where the x coordinate is 140 and the y coordinate is 100 to the position where the x coordinate is 280 and the y coordinate is 200.

The confidentiality determination unit 34 compares graphics drawing commands extracted from the print data to be subjected to a determination with the graphics drawing command stored in the confidential-document format memory 35. As a result, in the case where the confidentiality determination unit 34 confirms that a straight-line drawing command of "straight line x1=140 y1=100 x2=280 y2=200" is included in the print data that is a comparison target, the confidentiality determination unit 34 determines that the two graphics drawing commands match.

(2) Case of Rectangle

In the case where the confidentiality determination unit 34 compares drawing commands that specify drawing of a rectangle with each other, the confidentiality determination unit 34 calculates a matching rate between the drawing commands using the drawing-start-position coordinates, directions, and scales of the vectors of diagonals. A calculation method for the matching rate is the same as that for straight lines described above.

(3) Case of Circle

In the case where the confidentiality determination unit 34 compares drawing commands that specify drawing of a circle with each other, the confidentiality determination unit 34 calculates a matching rate between the drawing commands using the drawing-start-position coordinates of circles (the coordinates of the centers of the circles) and the sizes of their radii. A calculation method for the matching rate is the same as that for straight lines described above.

[Case of Image Drawing Command]

In the end, a specific method in the case where image drawing commands are compared with each other will be described.

In the case where the confidentiality determination unit 34 compares image drawing commands with each other, the confidentiality determination unit 34 extracts the binary data (byte string) of an image from an image drawing command stored in the confidential-document format memory 35, and confirms whether or not the print data to be subjected to a determination includes an image drawing command for which the same binary data is specified. Here, similarly to as in the case of the determination method for graphics drawing commands described above, the confidentiality determination unit 34 treats the two image drawing commands as the same image drawing commands when the matching rate is greater than or equal to a preset value.

Next, using a specific example of an image drawing command, the way in which a confidentiality determination process for image drawing commands is performed will be described with reference to FIG. 9.

For example, a description will be made using the case where, as illustrated in FIG. 9, an image drawing command, which is a drawing command of "image attributes, image data 0x 2B 31 99 1C 9B 23 . . . ", is stored in the confidential-document format memory 35. Here, image attributes are information indicating the attributes of an image to be drawn such as a magnification and the like.

This drawing command indicates that an image represented by binary data of "0x 2B 31 99 1C 9B 23 . . . " is to be drawn under settings specified by the image attributes.

The confidentiality determination unit 34 compares image drawing commands extracted from the print data to be subjected to a determination with the image drawing command stored in the confidential-document format memory 35. As a result, in the case where the confidentiality determination unit 34 confirms that an image drawing command of "0x 2B 31 99 1C 9B 23 . . ." is included in the print data that is a comparison target, the confidentiality determination unit 34 determines that the two image drawing commands match.

By performing the process as described above, in the image forming apparatus 10 according to the present exemplary embodiment, it is determined, in accordance with a PDL-format format image registered in advance in the confidential-document format memory 35, whether or not the print data for which the rasterization process has not been successfully completed in the drawing processing unit 32 is a security-control target.

Figure 10A:
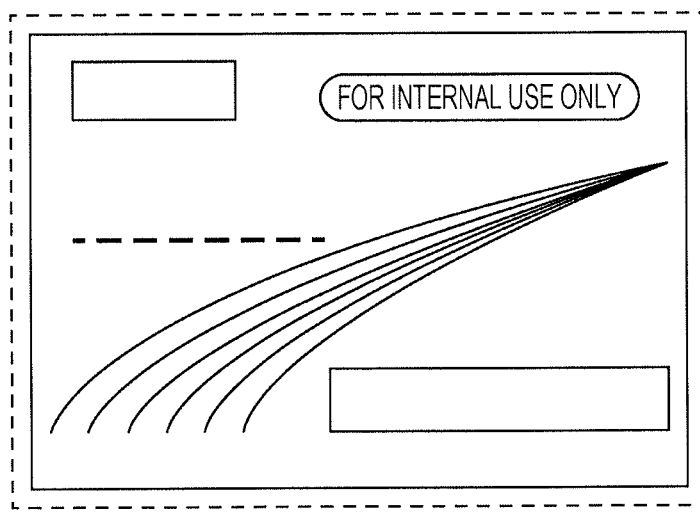
FIG. 10A is a diagram illustrating an example of an image based on confidential-document format PDL data (print data) preregistered in a confidential-document format memory.
Figure 10B:
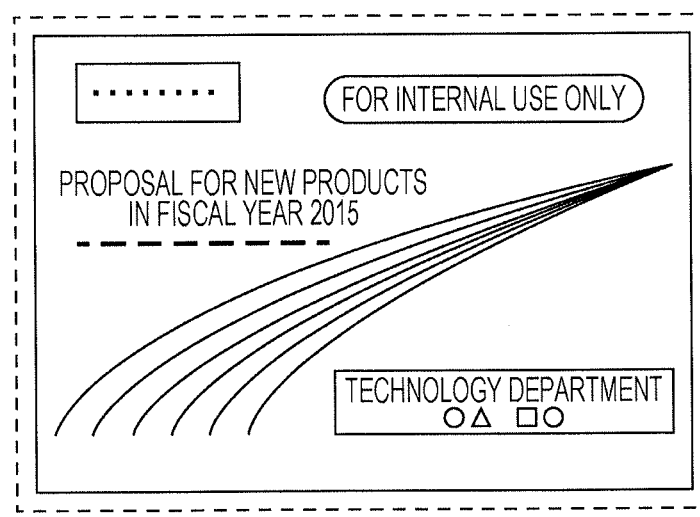
FIG. 10B is a diagram illustrating an example of a document image determined to be a security-control target.

For example, by prestoring PDL data (print data) of a format image as illustrated in FIG. 10A in the confidential-document format memory 35, a document image generated using this format as illustrated in FIG. 10B is determined to be a confidential document.

Figure 11A:
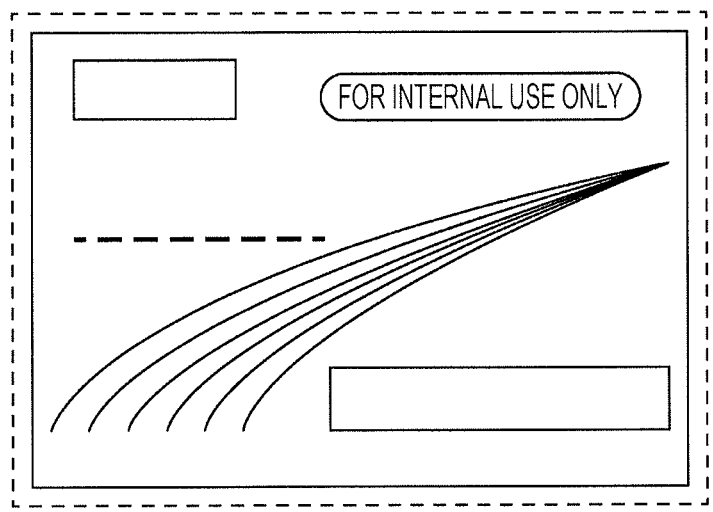
FIGS. 11A and 11B are diagrams for describing an example of the case where the drawing instructions of an image drawing command are split and issued.
Figure 11B:
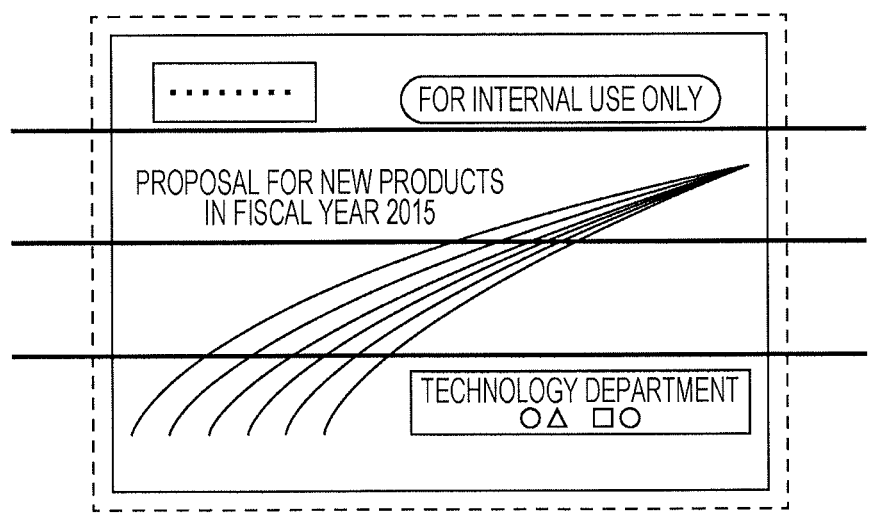

Note that in the case where the environment in which PDL data of a confidential-document format image is generated (an operating system (OS)), the type of driver software, and the like) differs from the environment in which print data to be subjected to a determination is generated, there may be the case where drawing instructions of an image drawing command are changed, and split-drawing instructions are issued for an image as illustrated in FIG. 11.

Thus, as illustrated in FIG. 12, in the case where the print data to be subjected to the determination includes an image drawing command whose binary data partially matches the binary data of an image drawing command included in the confidential-document format memory 35, the confidentiality determination unit 34 determines that the image drawing command included in the confidential-document format memory 35 matches the image drawing command included in the print data to be subjected to the determination.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a memory configured to store drawing commands indicating print data for which security control is necessary; and
   a hardware processor configured to implement:
   a generation unit configured to generate raster image data in accordance with input print data;
   a rasterization error detecting unit configured to detect a rasterization error before an image output process;
   a confidentiality detecting unit configured to detect a confidentiality of the input print data in response to the rasterization error detecting unit detecting the rasterization error by comparing the input print data and the drawing commands which are stored in the memory; and
   a warning unit configured to issue a warning that security control is necessary for the input print data in response to the confidentiality detecting unit detecting the confidentiality.

2. The image processing apparatus according to claim 1, wherein the warning unit determines whether or not the drawing commands of the print data include a drawing command stored in the memory on a per-type-of-drawing-command basis in accordance with the types of the drawing commands included in the print data, the types being character drawing, graphics drawing, and image drawing.

3. The image processing apparatus according to claim 2, wherein the memory stores drawing commands used to draw a format image used to generate a confidential document, as drawing commands used to determine print data for which security control is necessary.

4. The image processing apparatus according to claim 3, wherein the warning unit calculates the degree of matching between a certain drawing command among the drawing commands of the print data and a certain drawing command among the drawing commands stored in the memory, and in a case where the calculated degree of matching is greater than or equal to a preset value, the warning unit determines that the certain drawing command of the print data is the same as the certain drawing command stored in the memory.

5. The image processing apparatus according to claim 4, wherein in a case where a certain drawing command among the drawing commands of the print data matches a portion of a certain drawing command among the drawing commands stored in the memory, the warning unit determines that the certain drawing command of the print data is the same as the certain drawing command stored in the memory.

6. The image processing apparatus according to claim 2, wherein the warning unit calculates the degree of matching between a certain drawing command among the drawing commands of the print data and a certain drawing command among the drawing commands stored in the memory, and in a case where the calculated degree of matching is greater than or equal to a preset value, the warning unit determines that the certain drawing command of the print data is the same as the certain drawing command stored in the memory.

7. The image processing apparatus according to claim 6, wherein in a case where a certain drawing command among the drawing commands of the print data matches a portion of a certain drawing command among the drawing commands stored in the memory, the warning unit determines that the certain drawing command of the print data is the same as the certain drawing command stored in the memory.

8. The image processing apparatus according to claim 1, wherein the memory stores drawing commands used to draw a format image used to generate a confidential document, as drawing commands used to determine print data for which security control is necessary.

9. The image processing apparatus according to claim 8, wherein the warning unit calculates the degree of matching between a certain drawing command among the drawing commands of the print data and a certain drawing command among the drawing commands stored in the memory, and in a case where the calculated degree of matching is greater than or equal to a preset value, the warning unit determines that the certain drawing command of the print data is the same as the certain drawing command stored in the memory.

10. The image processing apparatus according to claim 9, wherein in a case where a certain drawing command among the drawing commands of the print data matches a portion of a certain drawing command among the drawing commands stored in the memory, the warning unit determines that the certain drawing command of the print data is the same as the certain drawing command stored in the memory.

11. The image processing apparatus according to claim 1, wherein the warning unit calculates the degree of matching between a certain drawing command among the drawing commands of the print data and a certain drawing command among the drawing commands stored in the memory, and in a case where the calculated degree of matching is greater than or equal to a preset value, the warning unit determines that the certain drawing command of the print data is the same as the certain drawing command stored in the memory.

12. The image processing apparatus according to claim 11, wherein in a case where a certain drawing command among the drawing commands of the print data matches a portion of a certain drawing command among the drawing commands stored in the memory, the warning unit determines that the certain drawing command of the print data is the same as the certain drawing command stored in the memory.

13. The image processing apparatus according to claim 1, wherein
the rasterization error comprises an indication that a rasterization process has not been successfully completed.

14. An image forming apparatus comprising:
a memory configured to store drawing commands indicating print data for which security control is necessary; and
a hardware processor configured to implement:
a generation unit configured to generate raster image data in accordance with input print data;
a rasterization error detecting unit configured to detect a rasterization error before an image output process;
a confidentiality detecting unit configured to detect a confidentiality of the input print data in response to the rasterization error detecting unit detecting the rasterization error by comparing the input print data and the drawing commands which are stored in the memory;
a warning unit configured to issue a warning that security control is necessary for the input print data in response to the confidentiality detecting unit detecting the confidentiality; and
an output unit configured to output an image on a recording medium in accordance with raster image data generated by the generation unit.

15. A non-transitory computer readable medium storing a program causing a computer to execute a process, the process comprising:
storing, in advance, drawing commands indicating print data for which security control is necessary;
generating raster image data in accordance with input print data;
detecting a rasterization error before an image output process;
detecting a confidentiality of the input print data in response to detecting the rasterization error by comparing the input print data and the drawing commands which are stored in the memory; and
issuing a warning that security control is necessary for the input print data in response to the confidentiality detecting unit detecting the confidentiality.

* * * * *